(12) United States Patent
Jones (10) Patent No.: US 8,468,332 B2
(45) Date of Patent: Jun. 18, 2013

(54) DYNAMIC LINK LOADING IN EXTENSIBLE FIRMWARE INTERFACE COMPLIANT SYSTEMS

(75) Inventor: Stephen E. Jones, Bellevue, WA (US)

(73) Assignee: Kinglite Holdings Inc., Singapore (SG)

( * ) Notice: Subject to any disclaimer, the term of this patent is extended or adjusted under 35 U.S.C. 154(b) by 541 days.

(21) Appl. No.: 12/566,624

(22) Filed: Sep. 24, 2009

(65) Prior Publication Data

US 2010/0318778 A1  Dec. 16, 2010

Related U.S. Application Data

(60) Provisional application No. 61/268,562, filed on Jun. 13, 2009.

(51) Int. Cl.
*G06F 9/24* (2006.01)

(52) U.S. Cl.
USPC ............................................. 713/2; 717/164

(58) Field of Classification Search
USPC ............................................. 713/2; 717/164
See application file for complete search history.

(56) References Cited

U.S. PATENT DOCUMENTS

| | | | | |
|---|---|---|---|---|
| 7,698,547 | B1 * | 4/2010 | Polyudov | 713/2 |
| 7,730,472 | B2 * | 6/2010 | Andersen et al. | 717/162 |
| 2005/0210222 | A1 | 9/2005 | Liu et al. | |
| 2008/0028200 | A1 | 1/2008 | Polyudov | |
| 2008/0163209 | A1 | 7/2008 | Rozas et al. | |

OTHER PUBLICATIONS

Volume 2: Platform Initialization Specification, Driver Execution Environment Core Interface, Version 1.2, May 13, 2009, 214 pages.
Volume 4: Platform Initialization Specification, System Management Mode Core Interface, Version 1.2, May 13, 2009, 286 pages.
Volume 1: Platform Initialization Specification, Pre-EFI Initialization Core Interface, Version 1.2, May 13, 2009, 214 pages.
Volume 3: Platform Initialization Specification, Shared Architectural Elements, Version 1.2, May 13, 2009, 326 pages.
Volume 5: Platform Initialization Specification, Standards, Version 1.2, May 13, 2009, 280 pages.

* cited by examiner

*Primary Examiner* — Albert Wang
(74) *Attorney, Agent, or Firm* — Lowe Hauptman Ham & Berner, LLP (57) ABSTRACT

Methods, apparatuses and program products are disclosed for dynamic link loading in extensible firmware interface compliant systems. Provision is made for loading a microkernel (or other kernel program) which presents itself as though it were a DXE Driver and hooks and redirects a loadmodule service of a DXE Foundation core program to a DLL aware loader. Further aspects of the invention provide related, analogous and similar capabilities.

16 Claims, 7 Drawing Sheets

FIG. 1

| | |
|---|---|
| SEC 202 | Security<br>Pre-verifier |
| PEI 204 | Pre-EFI initialization<br>Includes CPU clock mode, chipset, board initialization, RAM hardware level configuration. |
| DXE 206 | Driver Execution Environment<br>Includes EFI Driver Dispatcher, intrinsic services, Device, Bus and Service DXE Drivers |
| BDS 208 | Boot Device Selection<br>Includes Boot Manager, GRUB |
| TSL 210 | Transient System Load<br>Includes loading and initializing O/S |
| RT 212 | Run Time<br>Includes final O/S environment and O/S based applications programs |
| AL 214 | After Life<br>Includes support for shutdown or hibernate procedures |

# DYNAMIC LINK LOADING IN EXTENSIBLE FIRMWARE INTERFACE COMPLIANT SYSTEMS

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly relates to a system and corresponding method for dynamic link loading in extensible firmware interface compliant systems in a DXE (Driver Execution Environment) phase of a PC (personal computer) startup process. Similar processes within comparable computing apparatuses or within a single computer operational session or context also fall within the general scope of the invention.

BACKGROUND OF THE INVENTION

Modernly, the use of PCs (personal computers), including so-called laptop and notebook computers, is increasingly common and the computers themselves are ever more powerful and complex. A persistent problem is the unduly long elapsed time between the moment of power-on and the time when the PC has become ready for user stimulus and/or to initiate useful work.

Intel Corporation first defined EFI (Extensible Firmware Interface) as the programming interface exposed by firmware to O/S (operating system); former comparable firmwares were not sufficiently portable nor scalable to Intel's CPU (Central Processor Unit) IA64 architecture. A first implementation of the EFI interface became known as Tiano, which Intel Corporation offered under license via a web site. The UEFI Forum (Unified EFI Forum), a trade group, secured architectural control over EFI (and derivatives thereof) under a new name—UEFI, with a right to support and extend. The UEFI Forum documents and specifies the UEFI interface.

The PIWG (Platform Initialization Working Group) of the UEFI Forum provides a common internal framework for Silicon and platform drivers, so that a common understanding of the roles and methods used by Silicon and platform drivers is developed by implementers of UEFI firmware stacks together with the providers of the Silicon and platform drivers.

The UEFI and related standards provide richness, but fail to sufficiently address several significant specific areas of concern. The SCT (SecureCore Tiano™) System Overview published by Phoenix® Technologies Ltd. addresses a number of the problems.

One such problem with EFI/UEFI environments is the insufficiency (or complete lack) of a DLL (dynamic link library) facility for the use of developers of DXE (Driver Execution Environment) firmware. This is a runtime performance issue as well as a development issue.

The advantages of having a DLL capability available are well-known in the art and need not be further elaborated here. It is worth noting however that DLL facilities have not been generally available heretofore in EFI/UEFI environments and embodiments of the present invention shows how incorporation of such may advantageously be achieved. Previously developed solutions were not applicable because they depend either on a presence of an operating system environment or they require the control program to be adapted to support DLL capability. Embodiments of the present invention show how to achieve DLL capabilities without unduly restructuring the underlying foundation control program commonly termed "Foundation".

A significant advantage of embodiments of the invention over previously developed solutions is a greatly reduced ROM (read-only memory) footprint (or size) of newly developed complete BIOS (Basic input-output system) sets of programs that exploit the invention.

SUMMARY OF THE INVENTION

The present invention provides methods for operating a computer and also computer products and electronic devices that embody the method. In addition other means for exploiting the invention are presented.

According to an aspect of the present invention an embodiment of the invention may provide a method for dynamic link loading in extensible firmware interface compliant systems. This may include loading and initializing a computer comprising locating DLL (dynamic link library) import entries in images of DXE (Driver execution environment) drivers and fixing up the import entries after loading the DXE driver.

According to another aspect of the invention, a loadmodule service in a DXE Foundation core program may be hooked and conditionally redirected to either a DLL aware loader or the built-in loader of the foundation program itself.

According to a further aspect of the invention a UEFI (unified extensible firmware interface) ROM (read-only memory) module may be required as a source for needed instruction codes.

According to a further aspect of the invention a microkernel may be required.

Further provided for may be the loading of DXE Driver programs that export DLL based services that are imported by other DXE drivers and suitably fixed up.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

Embodiments of the disclosure presented herein provide methods, systems, apparatus, and computer-readable media for providing and utilizing a means for dynamic linking in a context of PC startup and initialization. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
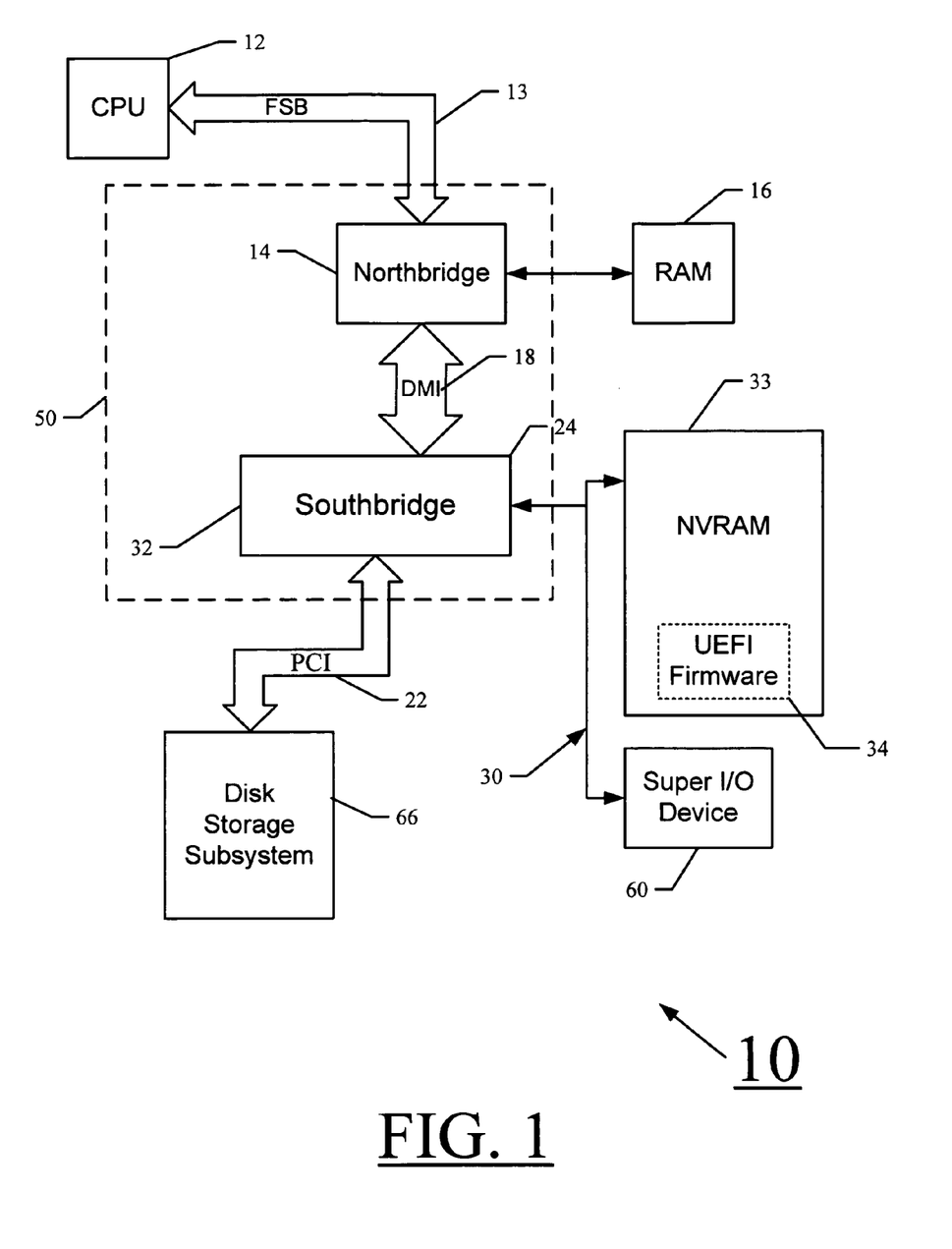
FIG. 1 is a schematic block diagram of an electronic device configured to implement the present invention.

An exemplary embodiment of the present invention will now be described with reference to the figures. FIG. 1 is a schematic block diagram of an electronic device configured to implement the operational functionality according to the present invention.

FIG. 1 shows a computer 10 that is operative to provide an EFI/UEFI firmware environment to provide a DXE phase and that facilitates execution parallelism during the DXE phase and even beyond such as into the BDS phase. The computer 10 typically includes a baseboard, or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a SuperI/O (Super input-output) device 60.

As known to those skilled in the art, an O/S (operating system) such as may be stored on disk 66 comprises a set of programs that control operations of a computer and allocation of resources. An application program is software that runs on top of the O/S software and uses computer resources made available through the O/S to perform application specific tasks desired by the user.

Disk 66 may also provide non-volatile storage for the computer 10. Although the description of computer-readable media contained herein refers to a mass storage device, such as a hard disk or CD-ROM drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, serial EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The peripheral interface 30 may also connect a computer storage media such as a ROM (Read-only memory, not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

Figure 2:
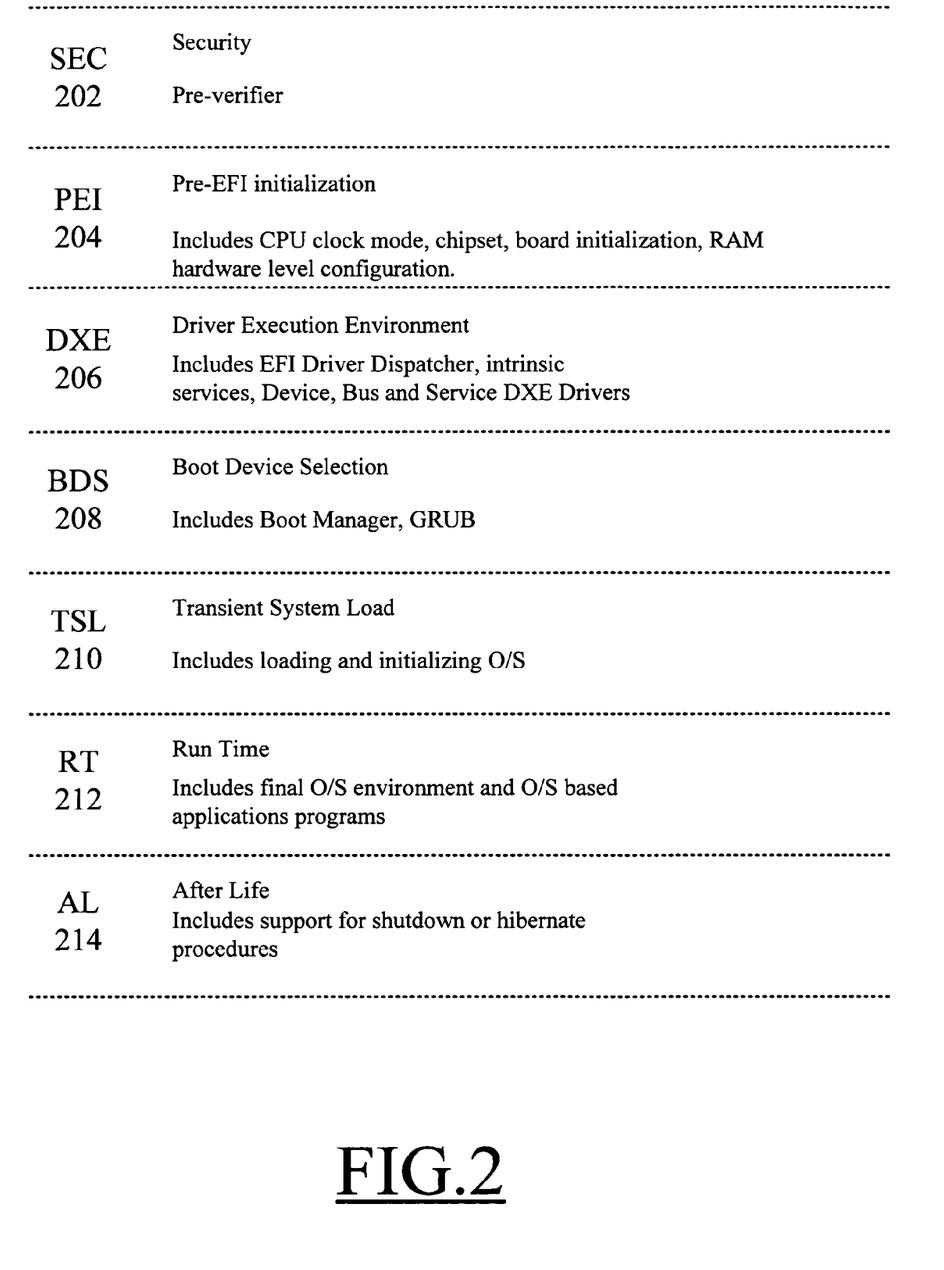
FIG. 2 shows an event sequence diagram according to an embodiment of the present invention.

FIG. 2 shows an event sequence diagram to illustrate an embodiment of operations performed by a computer system initializing in a EFI/UEFI conforming manner, that is following the EFI/UEFI Framework and according to an embodiment of the invention. Details regarding the operation and architecture of EFI/UEFI can be found in the appropriate previously developed and published documentation.

The process is divided into several phases, including a SEC (Security) phase 202, a PEI (Pre-EFI Initialization) phase 204, a DXE (Driver Execution Environment) phase 206, a BDS (Boot Device Selection) phase 208, a TSL (Transient System Load) phase 210, an O/S RT (Run-Time) phase 212, and an AL (After-Life) phase 214. The phases progressively provide a run-time environment for the PC applications.

The SEC phase 202 supports security checks from power-on initiation and authenticates the Foundation as a requirement prior to safely executing it.

The PEI phase 204 provides a standardized method of loading and invoking specific initial configuration routines for the processor, chipset, and motherboard. This phase is initializes sufficient system to provide a stable base for continuing. Initialization of core components including CPU, chipset and main motherboard occurs. The PEI phase locates and configures memory and hands it off to the DXE phase immediately following.

The DXE phase 206 is where much of the implementation of embodiments of the invention is to be found. This is the phase during which most of the system initialization is performed. The DXE phase 206 uses a DXE Core, a DXE Dispatcher (also known as the Driver Dispatcher or just Dispatcher for short) and a plurality of DXE Driver programs. The DXE Core provides Boot Services, Runtime Services, and DXE Services. The Driver Dispatcher discovers, loads and initiates DXE Drivers according to a pre-defined sequence. The DXE drivers initialize components and provide services (including software abstractions of some devices). Deployment of the invention significantly changes the functions associated with DXE Driver loading, but (for compatibility reasons) without changing Dispatcher itself and without changing any of Dispatcher's features as seen by DXE Drivers that choose not to exploit any of the features of the invention.

The BDS phase 208 further prepares the computer system to load an O/S. This may include such well known programs as GRUB (Grand Unified Bootloader)

The TSL phase 210 facilitates services to be available to an O/S loader. The RT (Run Time) phase 212, is largely software, rather than firmware controlled and includes problem programs. EFI Runtime services reemerge in the AL (After Life) phase 214 in connection with winding-up operations.

Figure 3A:
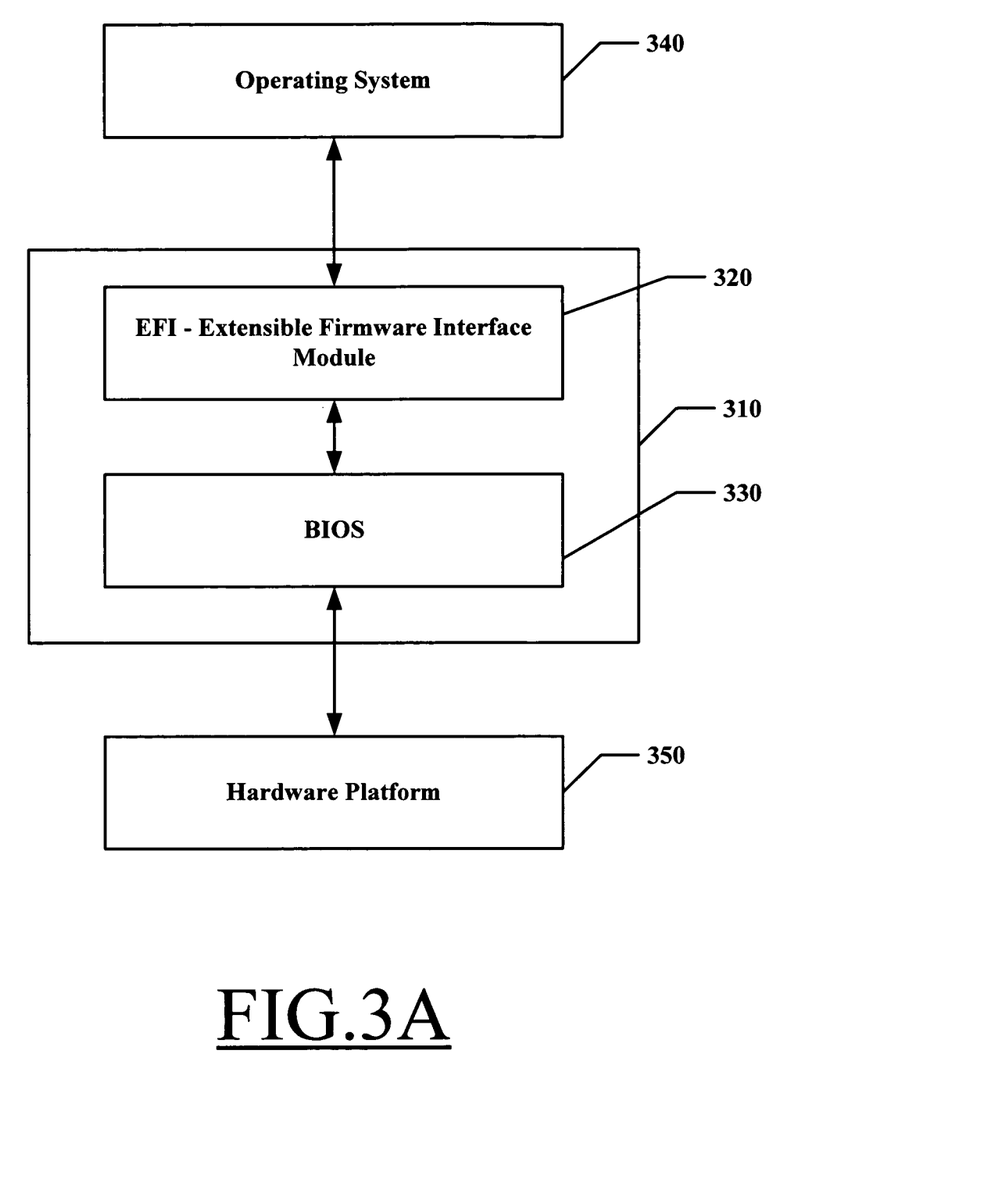
FIG. 3A shows relationships between major hardware and firmware components according to an embodiment of the invention.

FIG. 3A shows relationships between major hardware, firmware and software components according to an embodiment of the invention. Referring to FIG. 3A, platform firmware 310 comprises one or more modules 320 compliant EFI Specification (Extensible Firmware Interface from Intel® Corporation) or UEFI (Unified EFI) Specification (from the UEFI Forum—a trade organization). EFI and UEFI specifications describe an interface between O/S (Operating System) 340 and the platform firmware 310. EFI and UEFI specifications also describe the interface platform firmware 310 implements in support of bootloading interface used by O/S 340.

Platform firmwares are implemented in various ways within compliance with EFI and UEFI specifications and also include a BIOS 330 that provides a level of support for access to Hardware Platform 350. Hardware Platform 350 can itself come in multiple guises including hardware per se, as well as supporting microcoded engines and the like.

A provided DXE phase innovation of particular interest is the provision of DLL (Dynamic Link Library) services through incorporation of a microkernel (though a monolithic Kernel could also be used within the general scope of the invention). Microkernels provide functionality through their KPI (kernel program interface), in the form of functions callable by DXE drivers and UEFI applications. Kernels are well-known in the computing arts and refer to a central part of a software, firmware or microcode implementation and which have far reaching control at run time. Microkernels are also well-known; they have components that run at mutually differing privilege levels, interrupt levels or some such scheme.

Figure 3B:
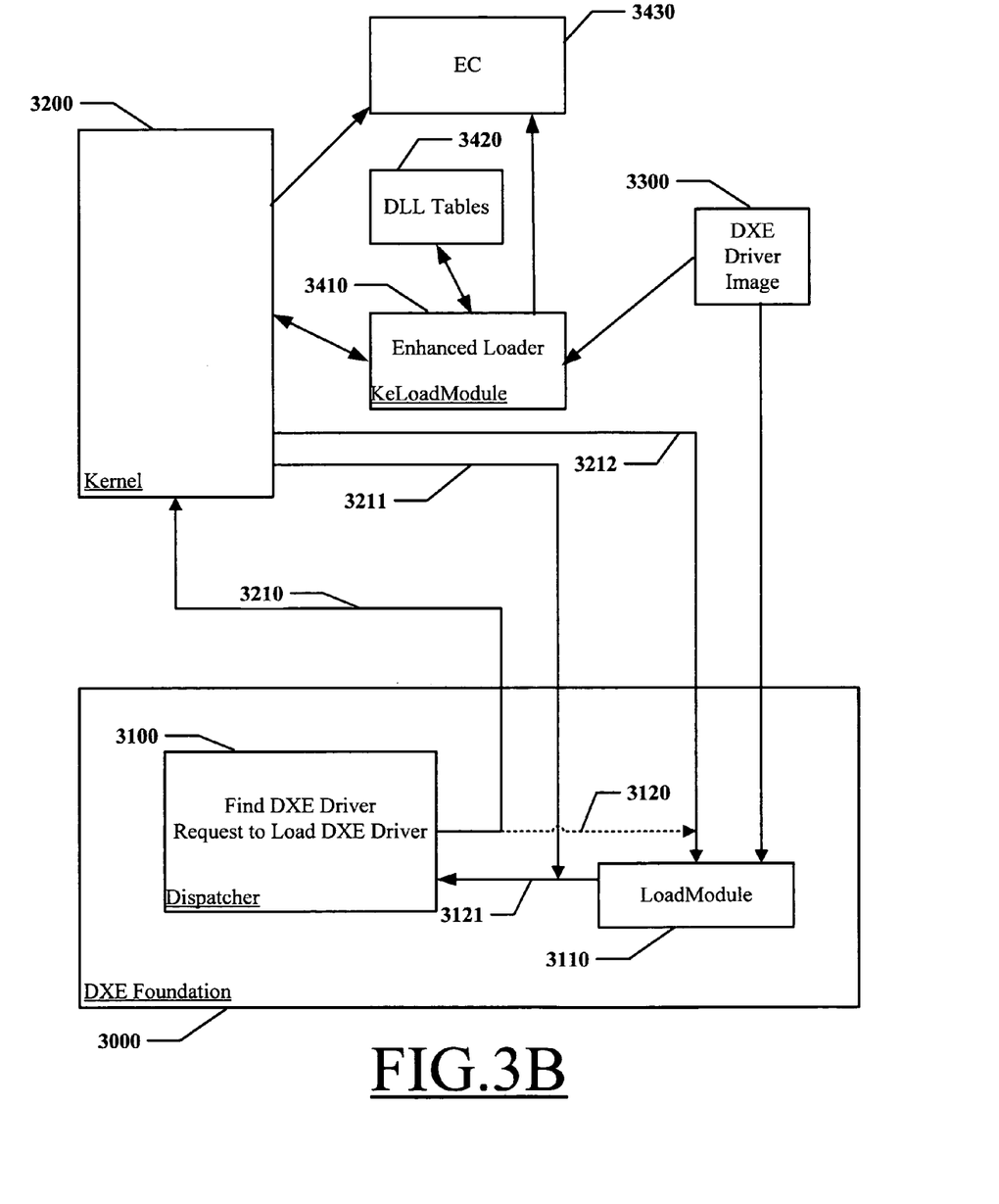
FIG. 3B shows relationships between Foundation, Kernel and DXE Driver components according to an embodiment of the invention.

FIG. 3B shows relationships between Foundation, Kernel and DXE Driver components according to an exemplary embodiment of the invention, however other comparable embodiments are very possible within the general scope of the invention. Ref. 3000 is a Foundation program; in a typical implementation this is an EFI or UEFI core program. Ref. 3100 is an important part of Foundation, the Dispatcher. Dispatcher 3100 reads steering information (not shown) to find DXE Driver images.

In an embodiment of the invention Kernel 3200 appears to the Foundation program be a DXE driver, the first DXE Driver to be loaded and it is loaded and initiated by Dispatcher's LoadModule service 3110. In this instance LoadModule 3110 is invoked by Dispatcher's 3100 normal control sequence 3120 and control returns from LoadModule 3110 to Dispatcher 3100 via the normal return path 3121.

When Kernel 3200, runs one of the earlier things it does is to locate LoadModule 3100 and hook LoadModule's entry path 3120 to a redirected entry path 3210 into Kernel. To do this Kernel must locate LoadModule and since it is not a reliably exported service Kernel may have to parse the object code of DXE Foundation 3000 to locate all the ways to reach LoadModule. Fishing expedition code of this type is well-known in the art and is made possible largely because DXE Foundation is, by design, a stable program that changes only rarely in practice.

After loading and running Kernel, Dispatcher 3100 may locate an exemplary DXE Driver image 3300. However, when Dispatcher goes to invoke LoadModule to request loading of DXE Driver image 3300 the call is hooked 3210 and control passes to Kernel 3200. Kernel 3200 scans DXE Driver image 3300 (it may do the scanning directly or through an intermediary program—not shown) to determine whether the DXE Driver contains DLL features such as import and/or export tables.

If the DXE Driver is a "vanilla" DXE Driver (i.e. is contains no DL (dynamic link) features) then control passes 3212 back to Foundation's 3000 LoadModule 3110 to ensure maximum compatibility for old software.

Conversely, if the DXE Driver Image 3300 is found to contain DL features then it is loaded into an Execution Context 3430 as a result of Kernel 3200 passing control to the enhanced loader program KeLoadModule 3410. KeLoadModule 3410 may perform functions usually associated with DLL loading mechanisms, especially for example maintaining DLL tables 3420 to support dynamic loader fixup of dynamic addresses. Having executed its own loader, Kernel returns control (ref. 3211) to Foundation via a return address rather than a hooked address thus inhibiting the use to Foundation's own built-in loader for the DLL enhanced DXE Driver recently loaded.

Figure 4A:
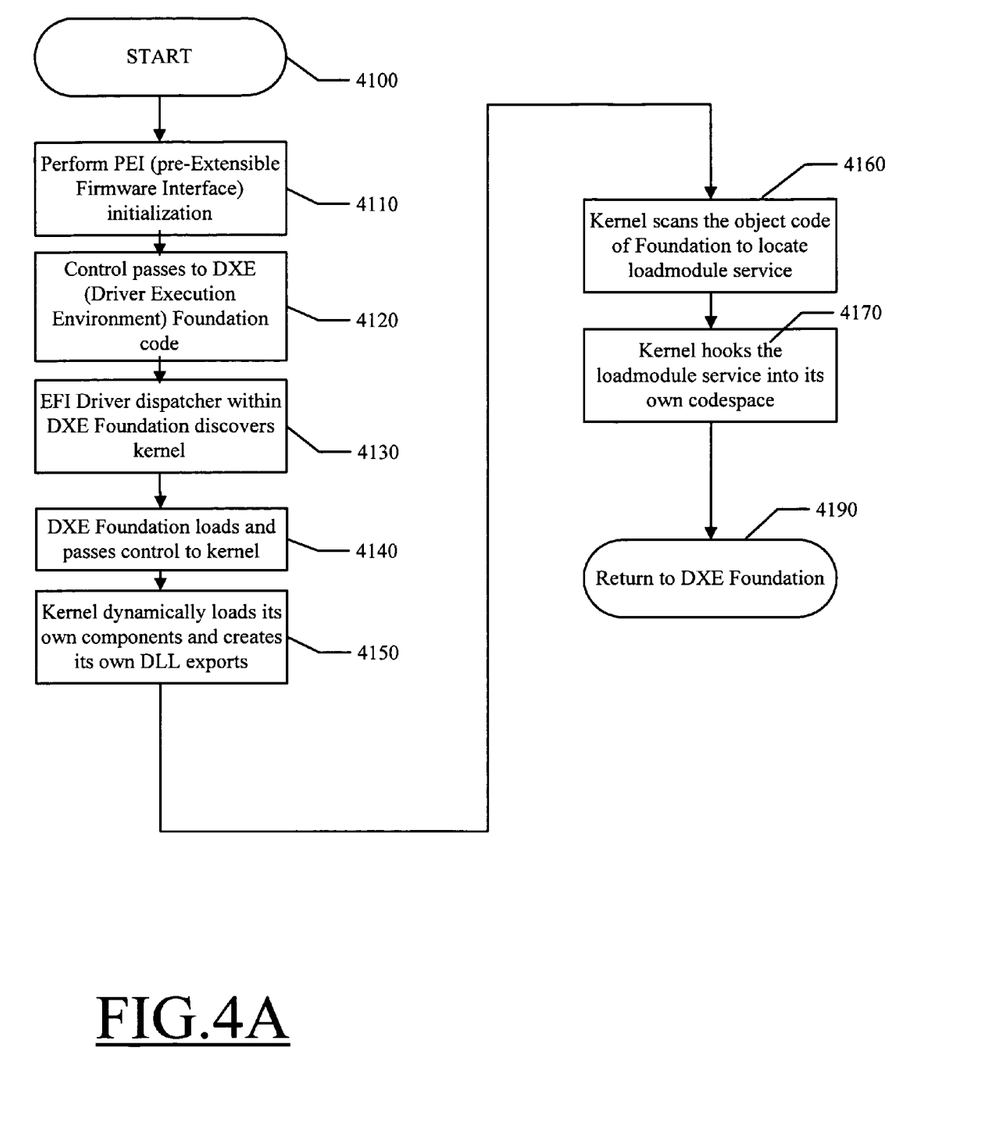
FIG. 4A shows a sequence of acts in which part of an embodiment of the invention is depicted of an embodiment of the invention.

Referring to FIG. 4A, a sequence of acts in which part of an embodiment of the invention is depicted as starting at ref. 4100, in a context of an EFI or UEFI compliant PC startup sequence having completed the first phase of startup from power-on (the SEC or Security phase).

At Ref. 4110, the pre-EFI phase is performed. This phase tends to be quite hardware specific and related to the type of controller and memory chips available. Both cache and main memory must be configured in and main memory is not available for general purpose use at the start of the pre-EFI phase, but becomes available at some point. Thus rather specialized techniques have evolved, for example chips which will eventually be configured as cache memory may initially be used as main memory while the main memory chips themselves are probed and configured in.

At Ref. 4120, control passes to the DXE (Driver execution environment) Foundation code which is highly standardized and operates as described earlier in the present document. By design the DXE Foundation code is intended to single thread through the loadable DXE Drivers, however according to an embodiment of the invention this behavior is modified as described below.

At Ref. 4130, the EFI Driver dispatcher (which is part of the EFI or UEFI Foundation program) discovers the Kernel program and at Ref. 4140 loads it into main memory and passes control to it. By design, the dispatcher searches for and discovers DXE drivers so the Kernel program is presented as appearing (to the dispatcher) to be a first DXE Driver. Loosely speaking one might say the Kernel is disguised to look like a DXE Driver program. Typically, though not essentially, Kernel will be loaded from (having been previously stored in) stored in NVRAM rather than hard disk since it is rather fixed for the platform and typically has an intimate relationship with (other) parts of BIOS. In an alternative embodiment within the general scope of the invention, it is possible for Kernel to be executed directly out of a ROM, however there are well-known disadvantages to such an approach even though it is substantially compatible and/or equivalent.

At Ref. 4150, Kernel dynamically loads its own components and creates its own DLL exports, typically in the form of memory resident export tables. The use of exports (and the corresponding imports feature) is well known in the DLL arts. Kernel may typically be implemented as a micro-kernel (such as with components running in differing machine, privilege and/or interrupt states). Kernel may typically be composed of a plurality of DLL components, loaded dynamically, perhaps in a cascade chain, and with export/import fixups within kernel itself.

At Ref. 4160, Kernel scans the object code of the Foundation program (if necessary locating it in memory first) in order to determine location of and/or references to Foundation's own loadmodule service and/or underlying code. Techniques for scanning stable object code such as the DXE Foundation program are well-known. At Ref. 4170, once the loadmodule service is located it can effectively be hooked or patched into kernel itself. In a manner similar to hooking interrupt chains at least two return paths can be provided—a first path that chains onto Foundation's own loader and a second path that returns, exits or jumps to Foundation in the same way (or at the same location and same context) that Foundation's own built-in loader may do when it completes.

At Ref. 4190, control is returned (by exiting) to the Driver Dispatcher that called Kernel. With execution now out of Kernel and back in Foundation, the end of FIG. 4A is reached and control returns to the Foundation program.

Figure 4B:
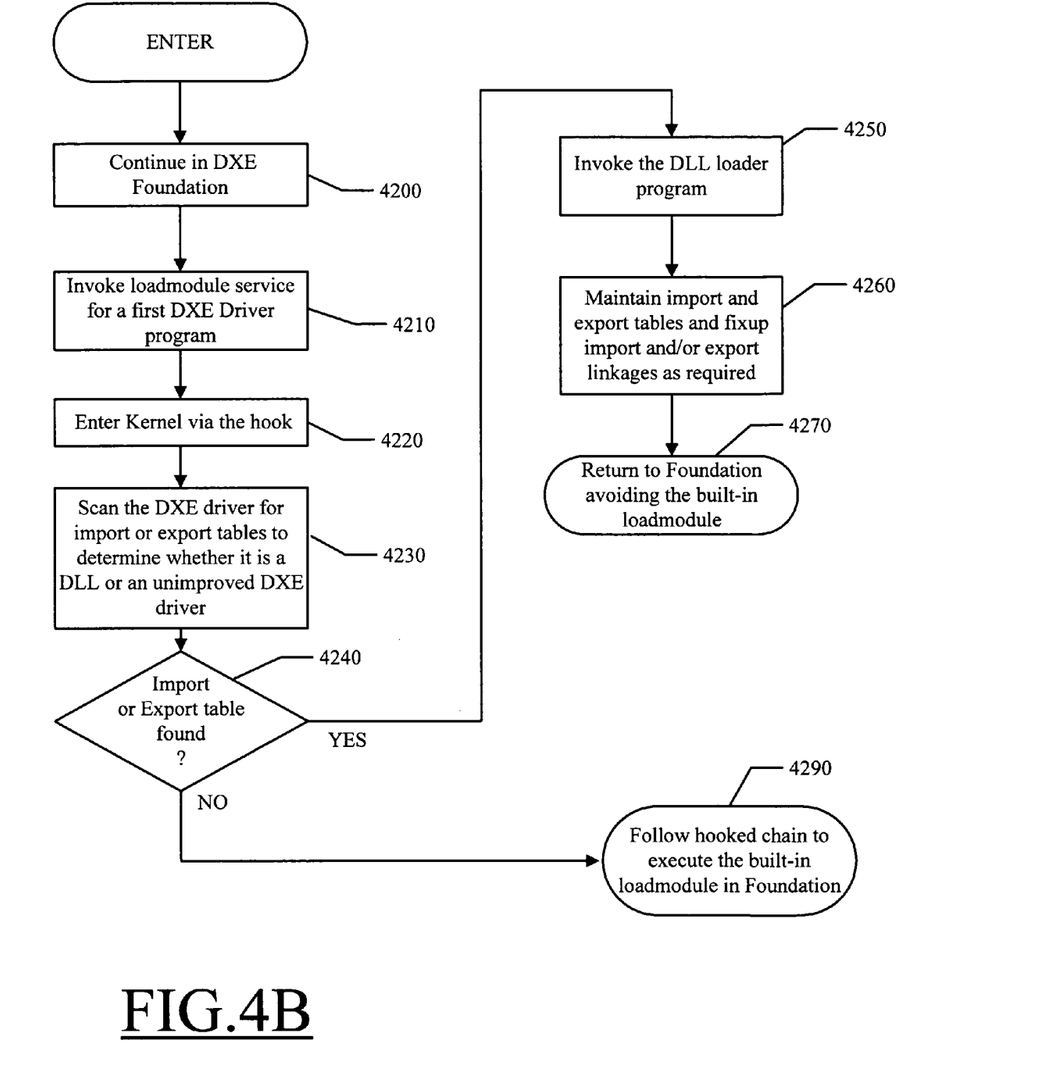
FIG. 4B shows a sequence of acts in which part of an embodiment of the invention is depicted according to another part of the embodiment of the invention.

Referring to FIG. 4B, which may be regarded as a continuation of the acts described in connection with FIG. 4A, the process continues at Ref. 4200 in the DXE Foundation code. At Ref. 4210, the first proper DXE Driver (excluding the Kernel program which DXE Foundation sees as a DXE driver) is located by Dispatcher and Dispatcher invokes the loadmodule service so as to request that it be loaded into memory.

Since the kernel program has already hooked the loadmodule service, at Ref. 4220 control passes to kernel.

At Ref. 4230 the kernel scans an image of DXE driver requested to be loaded for the presence of import or export tables. If import or export tables are present then the DXE driver is in DLL form and will require features in a kernel loadmodule service which service provides features that are not present in Foundation's loader. Alternatively the DXE driver may be of an unenhanced type, not a DLL program and import and export tables will be absent.

At Ref. 4240 the Kernel decides which loader to use based on the presence or absence of import tables and export tables, and if the enhanced features are not required then at Ref. 4290, the hooked chain is followed so as to execute the unenhanced loader built into Foundation.

If necessary, at Ref. 4250, kernel's DLL loader program (for example KeLoadModule) is invoked to load the DLL enhanced DXE driver. At Ref. 4260 the import entries in the import table are fixed up and the DLL exports are maintained by kernel so they can be reached by later loaded DXE drivers. As is usual in the DLL arts the loading of one driver may cause another DLL module to be loaded by name and so a whole cascade of loads make take place. The savings in run-time memory space and ROM space will be apparent to those of skill in the art. And similar considerations apply to savings in execution complexity and time (such as by being able to invoke functions by name rather than having to create and negotiate protocols).

At Ref. 4270, control returns to the DXE Foundation at the return address and without chaining onto Foundation's loader (since it is not need in this case, kernel's loader fully supports the DXE Driver load and fixup features available and supported).

Figure 5:
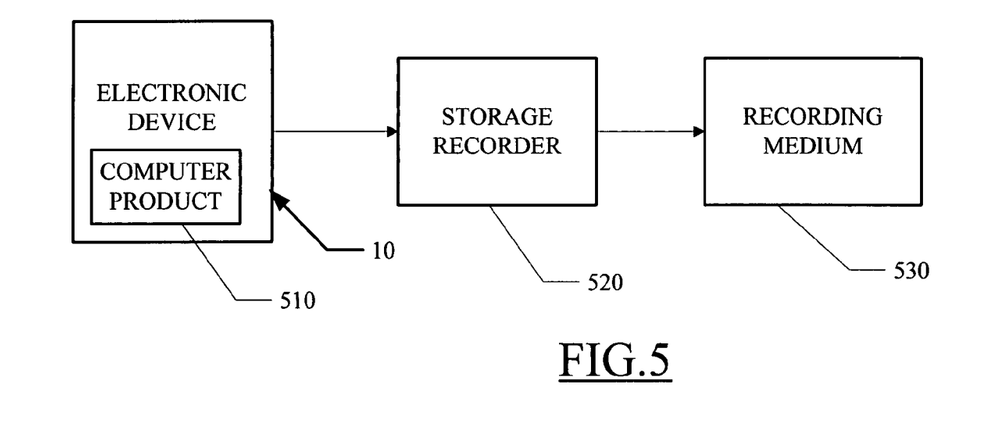
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
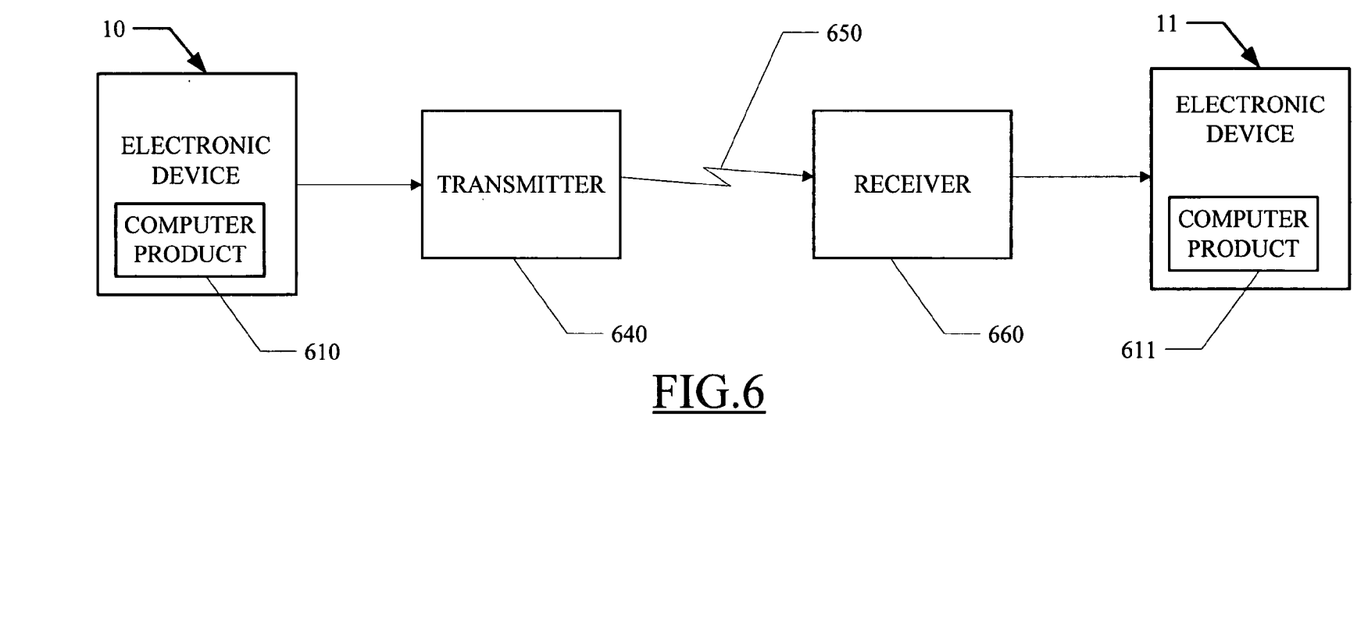
FIG. 6 shows how an exemplary embodiment of the invention may be encoded, transmitted, received and decoded using electro-magnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for loading and initializing a computer comprising:
    locating a first DLL (dynamic link library) import entry in a copy of a first DXE (Driver execution environment) driver;
    executing a first loader program to load the first DXE driver;
    fixing up the first DLL import entry;
    determining that no DLL import entry is present in a copy of a second DXE driver; and
    loading the second DXE driver with a second loader program.

2. The method of claim 1 wherein:
    a reference to the second loader program is a provided service of an EFI (extensible firmware interface) core program; and further comprising hooking the reference to the second loader program.

3. The method of claim 1 further comprising:
executing an EFI (extensible firmware interface) core program to load a kernel program wherein the kernel program loads the first loader program.

4. The method of claim 3 further comprising:
loading the EFI core program from a UEFI (unified extensible firmware interface) ROM (read-only memory) module.

5. The method of claim 3 wherein:
the kernel program hooks an instruction sequence in the EFI core program, the instruction sequence being for invoking the second loader program.

6. The method of claim 5 wherein:
the kernel program is a microkernel.

7. A method for loading and initializing a computer comprising:
executing a foundation program to load a kernel program into a memory;
executing the kernel program to redirect an instruction sequence flow within the foundation program towards a loader program service of the kernel program;
executing the loader program of the kernel program to load a first DXE (Driver execution environment) driver having a first import table; and
fixing up an entry in the first import table to an exported service of the kernel program.

8. The method of claim 7 wherein:
the foundation program is an EFI (extensible firmware interface) core program.

9. The method of claim 8 wherein:
the instruction sequence flow within the foundation program comprises a reference to the loader program service of the EFI core program.

10. The method of claim 7 further comprising:
executing the loader program service of the kernel program to load a second DXE driver having a second import table; and
fixing up an entry in the second import table to an export table entry in the first DXE driver.

11. The method of claim 7 wherein:
the kernel program is a microkernel.

12. The method of claim 7 further comprising:
loading the foundation program from a UEFI (unified extensible firmware interface) ROM (read-only memory) module.

13. A non-transitory machine-readable storage medium comprising:
at least one tangible computer-readable medium having instructions persistently encoded therein, the instructions when executed by at least one processor causes the at least one processor to perform:
locating a first DLL (dynamic link library) import entry in a copy of a first DXE (Driver execution environment) driver;
executing a first loader program to load the first DXE driver;
fixing up the first DLL import entry;
determining that no DLL import entry is present in a copy of a second DXE driver; and
loading the second DXE driver with a second loader program.

14. A non-transitory machine-readable storage medium comprising:
at least one tangible computer-readable medium having instructions persistently encoded therein, the instructions when executed by at least one processor causes the at least one processor to perform:
executing a foundation program to load a kernel program into a memory;
executing the kernel program to redirect an instruction sequence flow within the foundation program towards a loader program service of the kernel program;
executing the loader program of the kernel program to load a first DXE (Driver execution environment) driver having a first import table; and
fixing up an entry in the first import table to an exported service of the kernel program.

15. An electronic device comprising:
a controller;
a ROM (read-only memory) module having an EFI core program from a UEFI (unified extensible firmware interface) encoded therein; and
a first system memory having instructions encoded therein, the instructions when executed by the controller cause said controller to
operate by steps to perform:
locating a first DLL (dynamic link library) import entry in a copy of a first DXE (Driver execution environment) driver;
executing a first loader program to load the first DXE driver;
fixing up the first DLL import entry;
determining that no DLL import entry is present in a copy of a second DXE driver; and
loading the second DXE driver with a second loader program.

16. An electronic device comprising:
a controller;
a ROM (read-only memory) module having an EFI core program from a UEFI (unified extensible firmware interface) encoded therein; and
a first system memory having instructions encoded therein, the instructions when executed by the controller cause said controller to
operate by steps to perform:
executing a foundation program to load a kernel program into a memory;
executing the kernel program to redirect an instruction sequence flow within the foundation program towards a loader program service of the kernel program;
executing the loader program of the kernel program to load a first DXE (Driver execution environment) driver having a first import table; and
fixing up an entry in the first import table to an exported service of the kernel program.

* * * * *